Sept. 20, 1938.  D. W. THOMAS  2,130,701
SEALING RING
Filed Sept. 1, 1934  3 Sheets-Sheet 1

INVENTOR.
DAVID W. THOMAS
BY
*Kwis Hudson & Kent*
ATTORNEYS

Sept. 20, 1938.　　　D. W. THOMAS　　　2,130,701
SEALING RING
Filed Sept. 1, 1934　　　3 Sheets-Sheet 2

INVENTOR.
DAVID W. THOMAS
BY
Kwis Hudson & Kent
ATTORNEYS

Sept. 20, 1938. D. W. THOMAS 2,130,701
SEALING RING
Filed Sept. 1, 1934 3 Sheets-Sheet 3
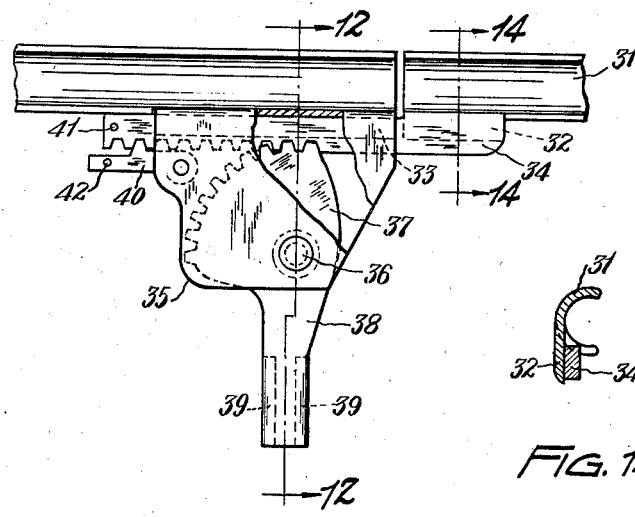
FIG. 11
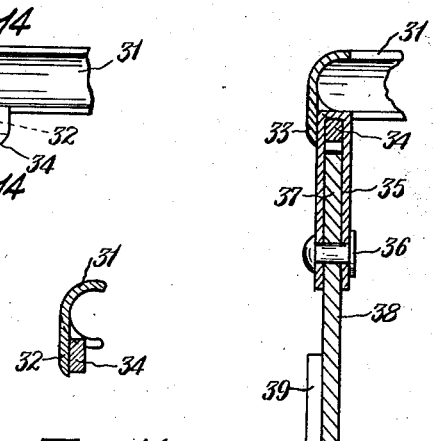
FIG. 14
FIG. 12
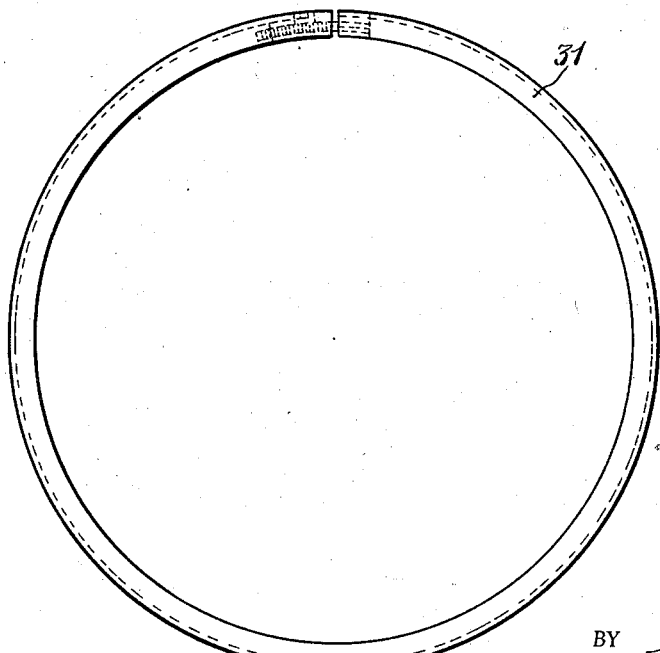
FIG. 10
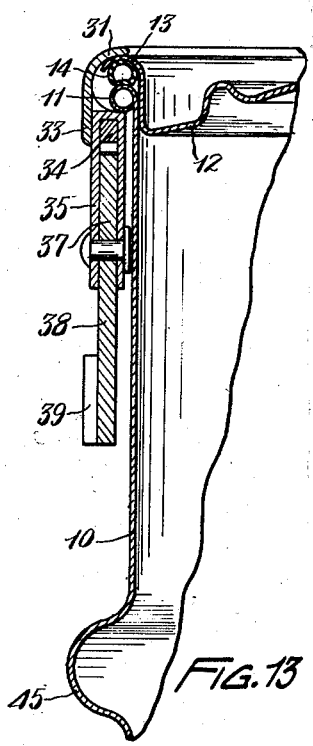
FIG. 13
INVENTOR.
DAVID W. THOMAS
BY
ATTORNEYS Patented Sept. 20, 1938

2,130,701

UNITED STATES PATENT OFFICE 2,130,701

SEALING RING

David W. Thomas, Youngstown, Ohio, assignor, by mesne assignments, to Republic Steel Corporation, Cleveland, Ohio, a corporation of New Jersey Application September 1, 1934, Serial No. 742,454

7 Claims. (Cl. 220—61)

This invention relates to improvements in sealing rings and method of applying same. The invention has to do with steel drums or barrels of that class in which the open end of the drum terminates in an external bead, the head or cover of the drum having a flange overlying said bead with a gasket interposed between the flange and bead, and in which the seal is effected by means of a split sealing ring of C-shaped cross section which is contracted to cam the cover flange down toward the bead and thereby to compress the gasket. Closures of this general character are illustrated in my copending applications Serial Nos. 674,640 and 731,928, filed June 7, 1933, and June 22, 1934, respectively, which applications have since been issued as Patents Nos. 2,054,105 and 2,093,787 respectively.

One of the objects of the present invention is the provision of closing and fastening means of a novel type, so positioned as to leave the top of the container entirely free and unobstructed.

Another object is the provision of a fastening or latching means which is adapted to cooperate with the rack of a rack and pinion closing means, so that the ends of the ring may be fastened together in more than one locking position.

Still another and an important object of the invention is the provision of a new method of closing the sealing rings which is independent of any mechanism on the ring itself, and which simplifies the construction of the ring with a consequent reduction in cost.

Other objects and features of novelty will appear as I proceed with the description of those embodiments of the invention which, for the purposes of the present application, I have illustrated in the accompanying drawings, in which, Fig. 1 is an elevational view of the upper portion of a metal drum with my preferred form of sealing ring in position thereupon.

Fig. 10 is a plan view of a modified form of sealing ring.

Fig. 11 is a large scale elevation of a fragment of the same viewed from the inner side of the ring.

Fig. 12 is a vertical sectional view taken substantially on the line 12—12 of Fig. 11.

Fig. 13 is a similar view taken on the same section line but showing the ring in position upon a drum.

Fig. 14 is a cross sectional detail view taken substantially on the line 14—14 of Fig. 11.

Figure 8:
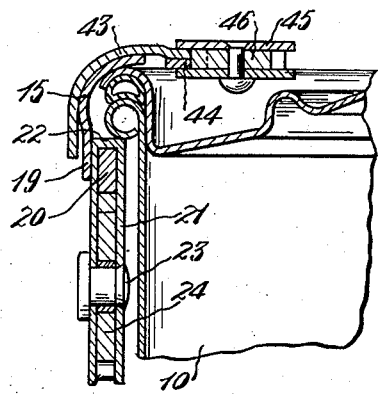
Fig. 8 is a cross sectional view taken substantially on the line 8—8 of Fig. 7 and showing the parts on a larger scale in position upon a drum.

In the drawings I have illustrated at 10 a steel drum or barrel having one open end that is provided, as shown particularly in Figs. 8 and 13, with an external bead 11. The head or cover 12 of the drum has a flange 13 which overlies the bead 11, and a soft rubber or other gasket 14 is interposed between the bead 11 and flange 13, this gasket being compressed when the closure of the drum is completed in order to effectively seal the drum.

The compression of the gasket 14 and the consequent sealing of the drum are effected by a split sealing ring 15 which is C-shaped in cross section, the upper flange of the ring engaging the flange 13 of the drum head and the lower flange of the ring engaging beneath the bead 11. Since these ring flanges are curved or cam-shaped, the contraction of the split ring serves to draw the flange 13 of the drum head down toward the bead 11, thereby compressing the gasket.

In the drawings I have shown mechanism on the sealing ring itself enabling an operator to close the ring. I have also shown a closing tool which can be applied to the sealing ring to close it independently of the mechanism on the ring. When the closing tool is used the closing mechanism on the sealing ring is not essential, and may be omitted if desired, but I prefer to include it in order that the container may be closed and sealed by operators not provided with the regular closing tool. In any event means for securing the ends of the sealing ring together in closed position is required. Under some of the broader aspects of the invention any suitable closing mechanism may be incorporated in the sealing ring itself, or may be omitted altogether. The preferred form of such mechanism illustrated in Figs. 1, 2, 3 and 4 will now be described.

Near the ends of ring 15 I form vertical slits 16 and 17 extending upwardly from the bottom edge of the ring. The metal of the ring beyond these slits is then bent down to form depending lips 18 and 19 which partake of the general curvature of the ring, that is to say, they lie in an imaginary cylinder struck from the axis of the drum.

To the rear of the lip 18 I weld a rack 20 stamped from sheet metal, of somewhat heavier gauge than the ring, and having teeth on its lower edge. That part of the rack which is attached to the lip 18 has a somewhat greater vertical dimension than the remaining part of the rack in order that its upper edge may lie substantially in the same horizontal plane with the upper surface of the bottom flange of the ring 15, and therefore function as a continuation of that flange in the compression of the gasket at that point.

Figure 1:
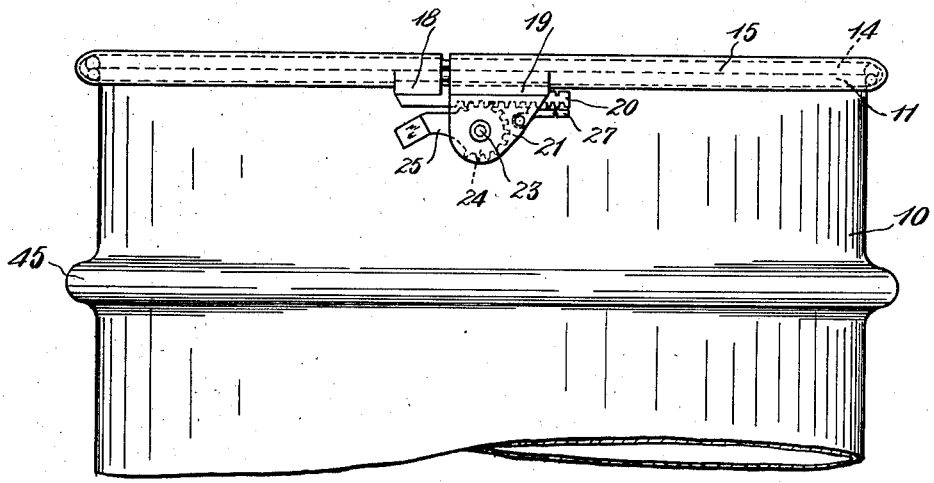
Figure 2:
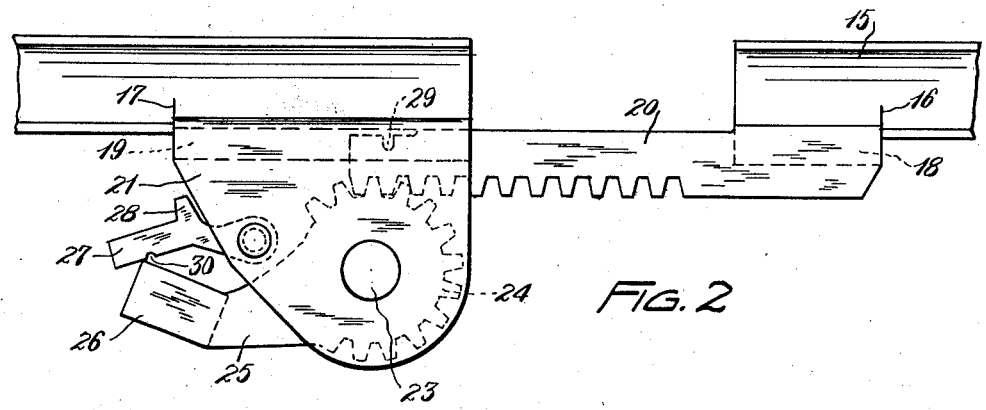
Fig. 2 is a fragmental elevational view on a larger scale of a portion of the sealing ring in open position, this view being taken from the inside of the ring.
Figure 4:
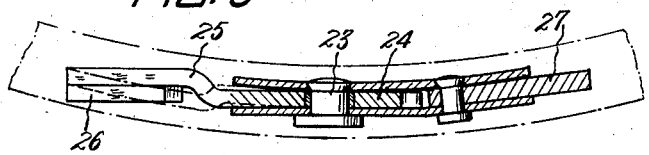
Fig. 4 is a horizontal sectional view taken substantially on the line 4—4 of Fig. 3.
Figure 3:
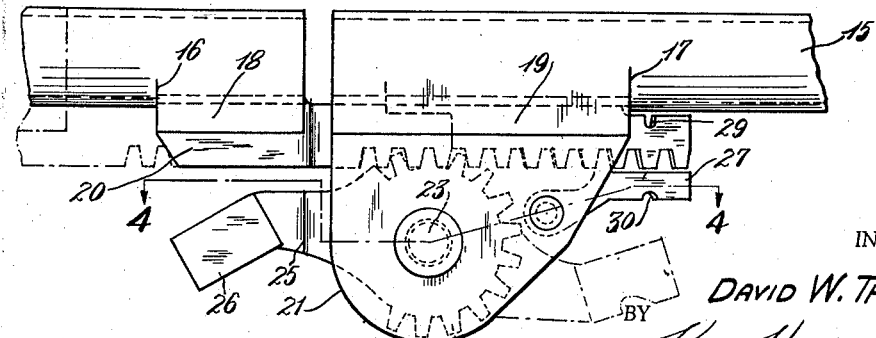
Fig. 3 is a similar view of the ring in closed position, taken from the outside of the ring.

The curved rack 20 is received and guided by a double-walled member 21 which is welded to the rear surface of lip 19. The member 21 has a connecting wall 22 at the top which forms a backing for the rack. This wall 22 also occupies substantially the same horizontal plane as the upper surface of the bottom flange of the ring 15, and functions to compress the gasket when the ring is closed. The double-walled member 21 directly beneath the end wall 22 is curved cylindrically to conform with the lip 19 and to form a suitable curved guide for the curved rack 20. The lower part of this double-walled member may be flattened more or less, particularly as to the outer wall, as indicated in Fig. 4, where it receives a pivot pin 23 upon which is rotatably mounted a pinion 24 provided with teeth meshing with the teeth of the rack 20. Integral with this pinion 24 there is a stub lever 25 which projects outwardly beyond the double-walled member 21. At its end it may be provided with an extra thickness of metal 26. When it is necessary to operate the pinion for the purpose of closing the ring 15, a piece of pipe may be slipped over the end of stub lever 25 in order to afford sufficient leverage for hand operation, or any other suitable implement may be employed for the purpose. Between the walls of the member 21 I also mount a pawl 27 which has a single tooth 28 that is adapted to enter the space between successive teeth of the rack 20 when the ring is drawn to closed position, as shown in Figs. 1 and 3. When the pawl 27 is in such locking position it is held there by the tendency of the ring 15 to expand. However, I prefer to tie it against accidental dislodgement in the handling of the drum, and for this purpose I may provide notches 29 and 30 in the rack and pawl, respectively, for the reception of a wire tie, the ends of which may be joined by a seal if desired.

When a drum provided with the sealing ring described is ready to be closed, the expanded ring is placed over the cover 12, its upper flange resting on the flange 13 of the cover and its lower flange engaging beneath the bead 11 of the drum. The pinion 24 is then revolved from the position of Fig. 2 to the position of Fig. 3, whereby the ring is contracted and the gasket 14 is compressed. The pawl 27 is then swung up to the position illustrated in Fig. 3, thereby securing the rack 20 to the double-walled member 21, and preventing the expansion of the ring. The pressure upon the lever 25 used to contract the ring may then be released, and a sealing wire to hold the pawl 27 in place may be applied if desired.

In Figs. 10 to 14 inclusive I have illustrated a slightly different form of closing mechanism applied to the sealing ring. In this case I have shown a ring 31 of the same C-shaped cross section as ring 15, provided with downwardly extending lips 32 and 33 similar in all respects to the lips 18 and 19 previously described. A curved rack 34 is welded to the inner surface of lip 32, and a double-walled member 35 is welded to the inner surface of the lip 33. These parts 34 and 35 are the same in all essential respects as the parts 20 and 21 previously described. Between the two walls of the member 35 on a pivot pin 36 I mount a pinion or sector 37 which is provided on one side of the pivot with a stub lever 38 extending outwardly beyond the double-walled member. The outer end of this stub lever may be provided with side flanges 39, between which a suitable bar can be inserted for operating purposes.

Figure 6:
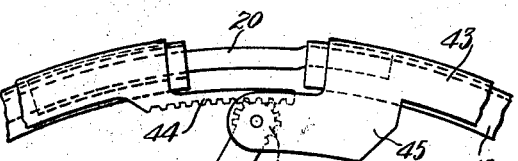

It will be observed that the lips 32 and 33 are so formed as to be flush with each other when the ring is closed. That portion of the rack 34 which extends through the guide member 35 is necessarily spaced back from the lip 33, as indicated in Figs. 12 and 13. I take care of this by providing the necessary horizontal offset in the rack 34 directly beyond the lip 32. A corresponding offset in the rack 20 for the ring 15 appears clearly in Fig. 6.

A pawl 40 similar to pawl 27 is employed for locking the ends of the ring 31 together in closed position. In this case I have shown perforations 41 and 42 in the rack 32 and pawl 40, respectively, for the reception of a wire tie having the same function as previously described in connection with the notches 29 and 30.

Figure 7:
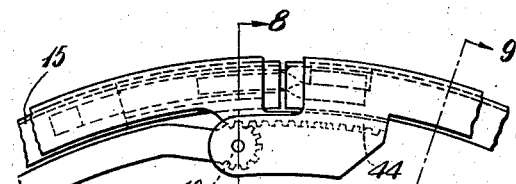
Figs. 6 and 7 are fragmental plan views showing the closing tool in position on the sealing ring, Fig. 6 showing the parts in open position and Fig. 7 showing them in closed position.
Figure 9:
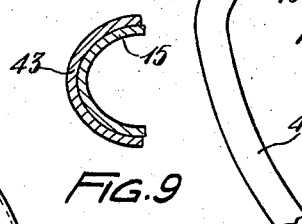
Fig. 9 is a cross sectional view taken substantially on the line 9—9 of Fig. 7.
Figure 5:
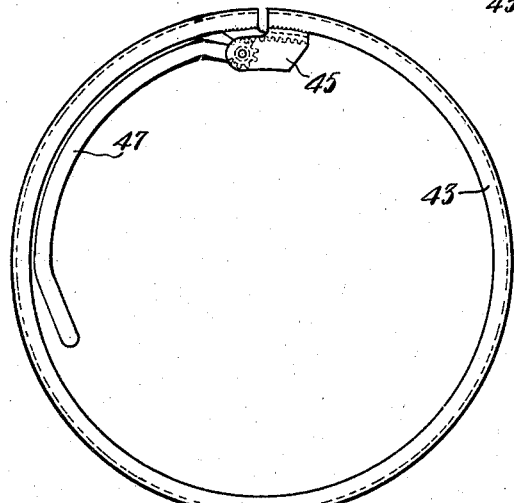
Fig. 5 is a plan view of a closing tool which may be employed in connection with the invention.

I will now describe my new method of closing the sealing ring by means of a special tool provided for the purpose, and independently of any mechanism on the sealing ring itself. This tool consists primarily of a split ring 43 slightly larger than the sealing ring so that it may be readily mounted upon the sealing ring in the manner indicated in Figs. 6, 7 and 8. For the best results this ring should be placed on the sealing ring with its split adjacent the split of the sealing ring, so that when the closing ring is contracted there will be a minimum of slippage between it and the sealing ring. The closing ring should have an upper flange to rest upon the upper flange of the sealing ring, and it may have a lower flange to embrace the lower flange of the sealing ring, as shown in Fig. 9, such a lower flange being desirable because it reenforces the closing ring. However, if the lower flange is used it must be removed or deflected downwardly at the ends of the ring, as indicated in Fig. 8, in order to accommodate the lips 18 and 19 or 32 and 33, as the case may be, of the sealing ring.

Any suitable lever mechanism may be provided upon ring 43 for closing the same and thereby drawing the ends of the sealing ring into closed position. That illustrated in the drawings is a lever operated rack and pinion mechanism which in some respects is similar to the rack and pinion mechanism previously described for the sealing ring, but differing from that mechanism in the respect that it is mounted entirely within the circle of the ring and occupies a position above the head of the drum when the ring is in operative position. It comprises a curved rack 44 with teeth on its inner edge, a double-walled member 45 acting as a guide for the rack and as a mounting for a pinion 46, and a relatively long lever 47 integral with the pinion 46. The rack 44 and the double-walled member 45 are preferably welded to the upper flange of the ring 43 on opposite sides of the slit therein.

When a drum is to be closed by the use of the closing tool just described, an open sealing ring is put into position on the drum. Then the closing ring 43 is mounted upon the sealing ring and the lever 47 operated to draw the ends of the closing ring together, this action also serving to draw the ends of the sealing ring together. The pinion 24 or 37 turns idly during such closing movement. While the operator holds the parts under tension by the lever 47, he throws the locking pawl 27 or 40 to operative position. Pressure upon the lever 47 may then be relieved and the lever swung to open the ring 43, after which the closing tool may be removed from the drum and the locking pawl secured in position by a wire tie. The package is then ready for shipment. When the contents of the drum are to be removed, the securing wire for the pawl is cut and removed and the pawl is pried loose with a heavy screw-driver or the like, when the ring expands in response to the pressure exerted by the compressed gasket 14. Light pressure on the stub shaft of the pinion may be used to open the sealing ring still further if necessary, and it may then be removed in order to permit the removal of the drum head.

It will be observed that in both forms of sealing ring herein disclosed all operating and locking mechanism is located on the outside of the drum, leaving the space above the head clear and unobstructed. The mechanism is also positioned close to the side wall of the drum and beneath the sealing ring, where it is protected by the sealing ring and also by one of the rolling rings or beads 45 of the drum. When the ring 31 is in closed position the stub lever 38 stands vertically and parallel to the axis of the drum, as shown in Fig. 11. When the ring 15 is closed the stub lever 25 extends substantially horizontally, but it may be bent somewhat so as to remain entirely within the circle of the ring as indicated in Fig. 4, where it is protected from damage or accidental operation.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. A closing means for steel drums or the like, comprising a contractible split ring, a rack carried by and rigidly attached to one end of the ring extending beneath the ring and adapted when the ring is assembled upon a drum to stand on the outside of the drum, said rack having a curvature like that of the ring, a vertical pinion rotatably mounted upon the other end of the ring upon an axis fixed with respect thereto, said pinion being adapted to stand outside the drum below the top thereof, said pinion meshing with said rack, and means for turning said pinion to draw the ends of the ring toward each other.

2. In combination, a metal drum provided at its upper end with an external bead, a cover having a flange overlying said bead, a gasket interposed between said bead and flange, a contractible split sealing ring C-shaped in cross section embracing said bead and flange, and means for contracting said ring comprising a rack rigidly attached to one end of the ring having the same curvature as the ring and extending along the other end of the ring beneath the same, and a pinion rotatably mounted upon the last named end of the ring meshing with said rack, said pinion being positioned beneath the rack upon an axis fixed with respect to the last named end of the ring, and means for rotating the pinion to draw the ends of the ring together.

3. In combination, a metal drum provided at its upper end with an external bead, a cover having a flange overlying said bead, a gasket interposed between said bead and flange, a contractible split sealing ring C-shaped in cross section embracing said bead and flange, one end of said ring having a vertical arcuate rack attached thereto and forming an elongated extension of the ring, said rack lying adjacent the other end of the ring when the latter is in closed position, a pinion mounted on the last named end of the ring in engagement with said rack, whereby the rotation of the pinion acts to move the ends of the ring toward or away from closed position, and a latch pivoted on the last named end of the ring for engagement with the toothed portion of said rack to hold the ends of the ring together in closed position.

4. In a device of the character described, a split ring of channel form having upper and lower inwardly extending flanges, a toothed rack mounted on the lower flange at one free end of the ring and extending beyond the free end thereof, a gear and lever member pivotally mounted on the other free end of said ring below the lower flange thereof for cooperative engagement with the rack to effect closing and clamping movement of the ring ends, said rack and lever member being disposed without projection beyond the outer periphery of the ring, and means on the ring for cooperating with the rack and lever mechanism to prevent opening movement of said ring ends.

5. In a device of the character described, a split ring of channel form having upper and lower inwardly extending flanges, a toothed rack mounted on the lower flange at one free end of the ring and extending beyond the free end thereof with the same curvature as that of the ring, a gear and lever member pivotally mounted on the other free end of said ring below the lower flange thereof for cooperative engagement with the rack to effect closing and clamping movement of the ring ends, and means on the ring for cooperating with the rack and lever mechanism to prevent opening movement of said ring ends.

6. A closing means for steel drums or the like, comprising a split cover securing ring, a horizontal rack extending edgewise rigidly fixed to and depending from one end of the ring and extending beyond said end, said ring having the same curvature as the ring, a guide fixed to and depending from the other end of the ring in position to receive said rack and guide it along a circle concentric with the ring, said guide comprising a vertical pinion meshing with said rack, and means for turning said pinion.

7. In a steel drum of the type in which there is an outwardly extending rim and a head overlapping the rim with a gasket interposed between them, means for closing and sealing the drum comprising a contractible split ring with its ends in end to end relation, a curved rack concentric with the ring, rigidly attached to the lower side of the ring and extending beyond one end thereof, a vertical pinion carried by the other end of the ring and mounted to turn upon an axis fixed with respect to said end, said pinion engaging said rack, and means for turning said pinion arranged to stand in a substantially vertical position when the ring is closed.

DAVID W. THOMAS.